US012570116B2

(12) United States Patent
Lindell

(10) Patent No.: US 12,570,116 B2
(45) Date of Patent: Mar. 10, 2026

(54) LOCKING ARRANGEMENT FOR A MEANS OF TRANSPORT TO BE TOWED

(71) Applicant: COLIMAN OY, Pihtipudas (FI)

(72) Inventor: Matti Lindell, Tampere (FI)

(73) Assignee: COLIMAN OY, Pihtipudas (FI)

( * ) Notice: Subject to any disclaimer, the term of this patent is extended or adjusted under 35 U.S.C. 154(b) by 434 days.

(21) Appl. No.: 18/044,803

(22) PCT Filed: Sep. 8, 2021

(86) PCT No.: PCT/FI2021/050598
§ 371 (c)(1),
(2) Date: Mar. 10, 2023

(87) PCT Pub. No.: WO2022/058649
PCT Pub. Date: Mar. 24, 2022

(65) Prior Publication Data
US 2023/0364956 A1 Nov. 16, 2023

(30) Foreign Application Priority Data

Sep. 17, 2020 (FI) ...................................... 20205898

(51) Int. Cl.
*B60D 1/60* (2006.01)
*B60D 1/06* (2006.01)
(52) U.S. Cl.
CPC *B60D 1/60* (2013.01); *B60D 1/06* (2013.01)
(58) Field of Classification Search
CPC ...................................................... B60D 1/60
See application file for complete search history.

(56) References Cited

U.S. PATENT DOCUMENTS 4,774,823 A * 10/1988 Callison ................... B60D 1/60
70/57
6,244,614 B1 * 6/2001 Bonvillain ............... B60D 1/60
280/507
(Continued)

FOREIGN PATENT DOCUMENTS

SE 1551088 A1 2/2017
WO 2013041108 A1 3/2013
WO 2017071714 A1 5/2017

OTHER PUBLICATIONS

International Search Report and Written Opinion in corresponding International Application No. PCT/FI2021/050598 mailed Dec. 9, 2021 (10 pages).
(Continued)

*Primary Examiner* — Kevin Hurley
(74) *Attorney, Agent, or Firm* — Jeffri A. Kaminski; Venable LLP

(57) ABSTRACT

The invention relates to a locking arrangement for a means of transport to be towed, such as a trailer, a tow-behind cart, or the like. A locking arrangement is intended to prevent a ball clamp, included in a device to be towed, such as in its drawbar, from being coupled to a hitch ball included in a towing vehicle, said locking arrangement including at least mechanical locking elements for preventing the ball clamp from being coupled to the hitch ball. The locking arrangement includes electrical locking elements for preventing/enabling the coupling of the ball clamp to the hitch ball electrically on a remote operation principle.

17 Claims, 3 Drawing Sheets

(56)     References Cited

U.S. PATENT DOCUMENTS

Figure 1A:
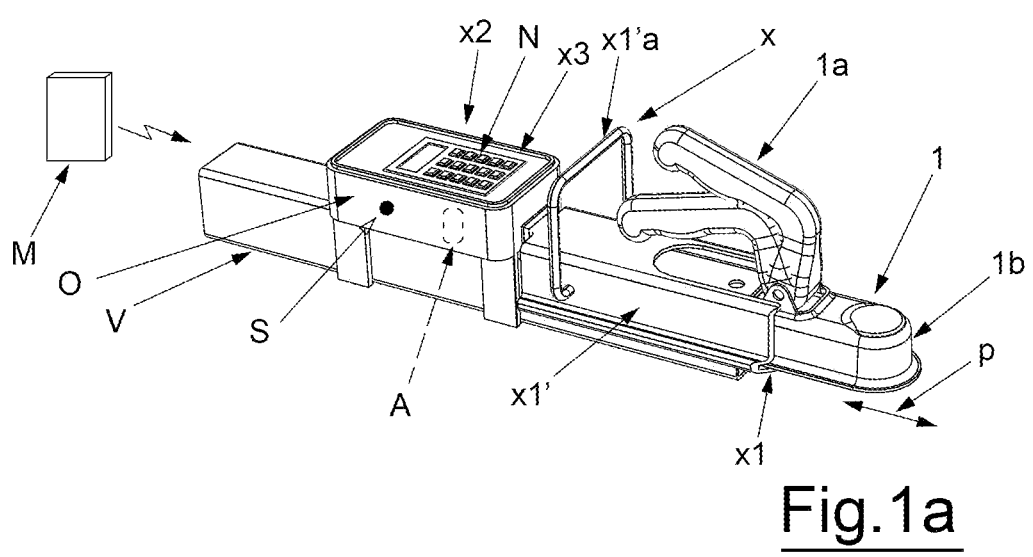

| 9,707,812 | B2 | | 7/2017 | Budge |
| 10,500,911 | B1 | * | 12/2019 | Scarborough ........... B60D 1/60 |
| 2002/0003341 | A1 | | 1/2002 | Hall |
| 2009/0322061 | A1 | | 12/2009 | Rodriguez |
| 2017/0313145 | A1 | | 11/2017 | McDougal |

OTHER PUBLICATIONS

Extended European Search Report in corresponding European Application No. 21868792.9 dated Oct. 4, 2024 (7 pages).

* cited by examiner

LOCKING ARRANGEMENT FOR A MEANS OF TRANSPORT TO BE TOWED

CROSS-REFERENCE TO RELATED APPLICATIONS

This application is a U.S. National Stage application of PCT/FI2021/050598, Sep. 8, 2021 and published on Mar. 24, 2022 as WO 2022/058649, which claims the benefit of Finnish Patent Application No. 20205898, filed Sep. 17, 2020, all of which are hereby incorporated by reference in their entireties.

The invention relates to a locking arrangement for a means of transport to be towed as set forth in the independent claim directed thereto.

At present, trailers are rented most often at so-called brick and mortar shops or service stations. The pick-up and return of a rental trailer requires an employee who:

verifies the identity of a renter, prepares a rental agreement and clarifies rental terms, receives the rental fee, steps outside to release the trailer locking or gives the renter a key to the lock after a rental period, receives the trailer and takes care of its locking, and inspects the trailer's condition, most importantly the working of lights, which in practice is inconvenient without power supply.

Thus, it is due to its traditional nature that the management of rental service as described above necessitates personnel.

Publication U.S. Pat. No. 10,500,911 discloses a locking mechanism for a towable trailer, said locking mechanism being intended to prevent a ball clamp included in the towable device's tongue from being coupled to the towing vehicle's hitch ball. The locking mechanism includes both mechanical locking elements for disallowing the coupling of a ball clamp to a hitch ball and electrical locking elements for preventing/enabling the coupling of a ball clamp to a hitch ball electronically on a remote actuation principle.

Publication US 2002/0003341, on the other hand, discloses a trailer locking mechanism, including both mechanical locking elements for coupling a ball clamp to a hitch ball and electrical locking elements and a battery for enabling the coupling of a ball clamp to a hitch ball electrically on a remote actuation principle.

Moreover, publication WO 2017/071714 discloses a trailer tracking system based on satellite positioning.

The objective of a locking arrangement according to the present invention for a means of transport to be towed is to provide a decisive remedy for the foregoing problems and to thereby elevate substantially the existing prior art. In order to attain this objective, the locking arrangement of the invention is principally characterized by what is presented in the characterizing part of an independent claim directed thereto.

The most notable benefits offered by a locking arrangement of the invention for a means of transport to be towed include especially the simplicity and working reliability of constructions and equipment stock applicable for its implementation, providing thereby the ability to significantly facilitate e.g. trailer rental service without a need for extra staff and to ensure the management of transport equipment provided with the locking arrangement by being continuously aware of its location. Hence, it is possible to pursue rental service in any appropriate location without regard to e.g. time of day and day of the week.

In addition, the remote-controlled locking arrangement enables in trailer rental service a dynamic pricing practice used e.g. in airline ticket sales, thus improving the profitability of rental service and the utilization rate of rental equipment. Furthermore, it is also by means of so-called ecommerce data that demand fluctuations can be easily monitored. This also makes it possible to offer lower rental prices during lower demand (attractive price conception), whereby, on the other hand, it is possible during higher demand to sustain rental price at a higher level when there is not enough capacity on the market.

The dependent claims directed a locking arrangement of the invention for a means of transport to be towed present other preferred embodiments therefor.

Figure 1B:
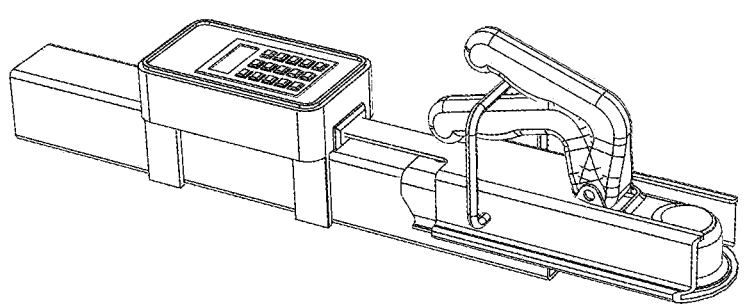
Figure 1C:
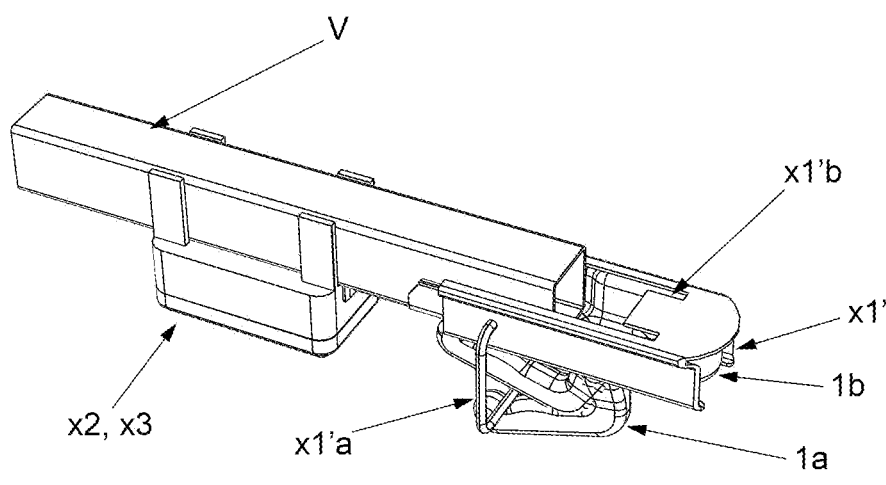
Figure 2A:
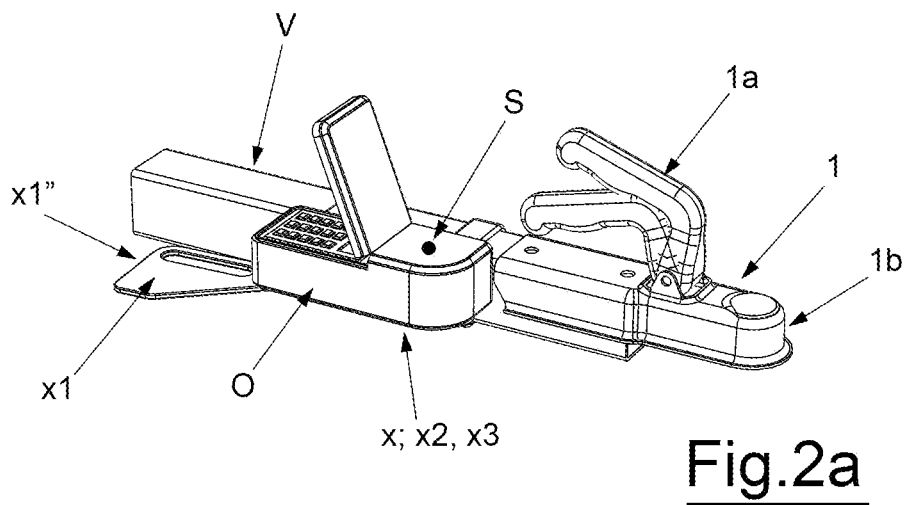
Figure 2B:
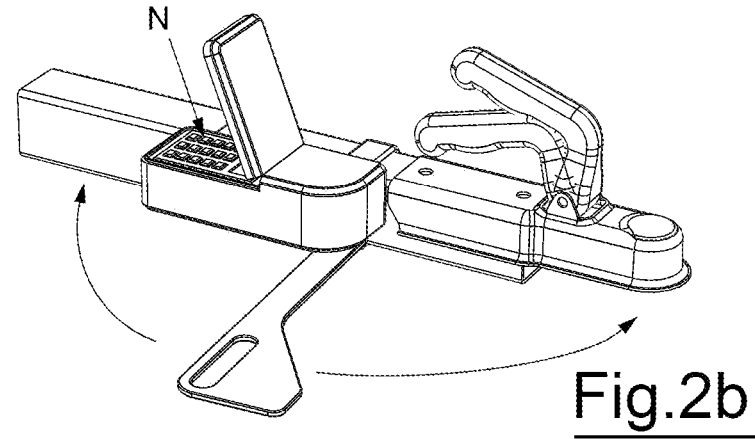
Figure 2C:
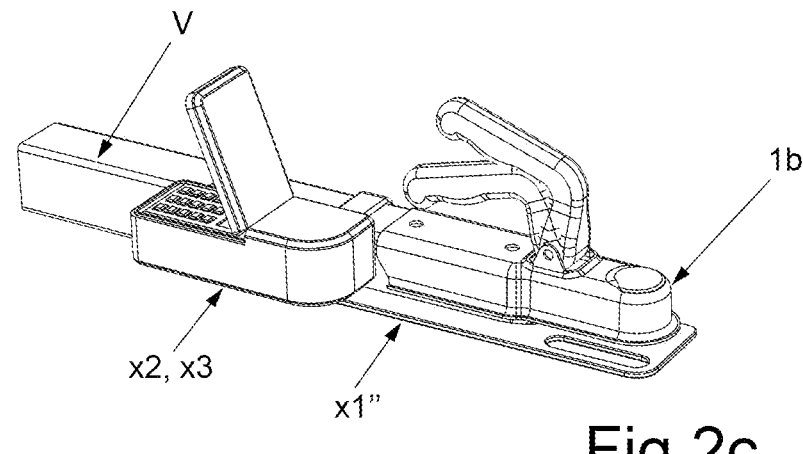
Figure 3A:
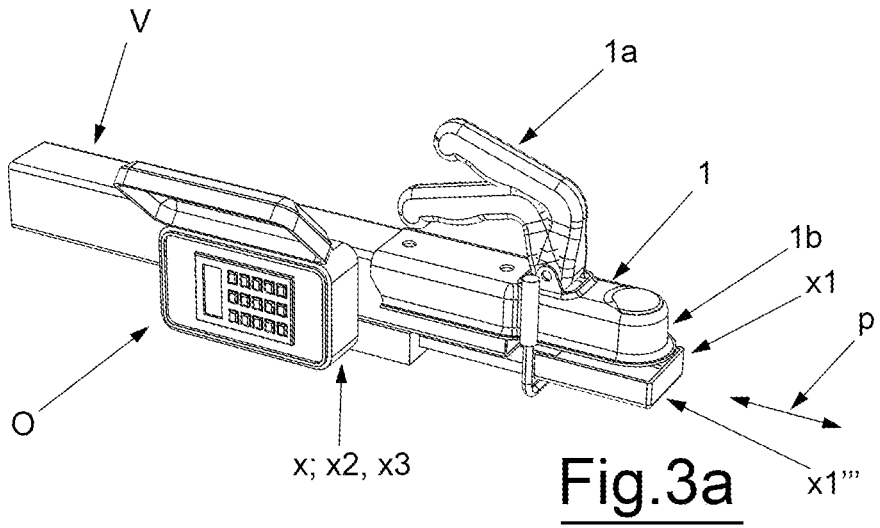
Figure 3B:
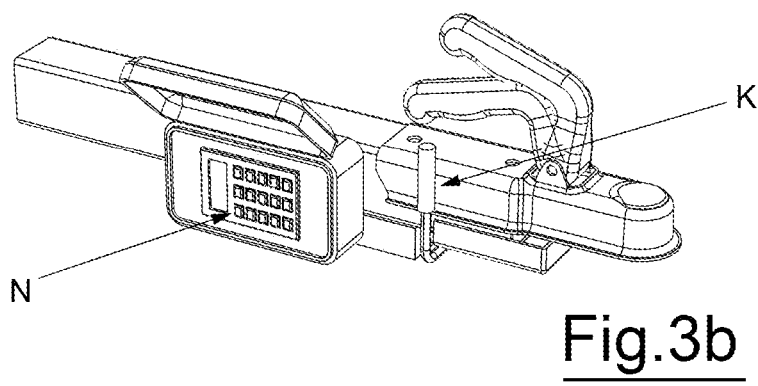
Figure 3C:
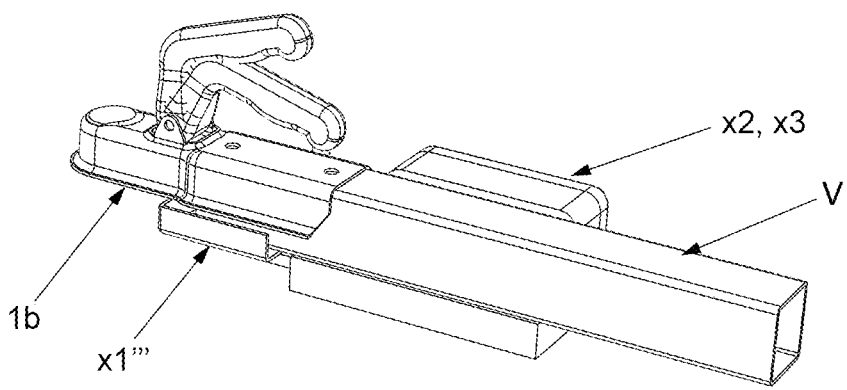

In the subsequent specification, the invention will be described in detail with reference to the accompanying drawings, in which:

FIGS. 1a-1c show one preferred locking arrangement of the invention for a means of transport to be towed, in perspective views as seen obliquely from the front and above with its locking arrangement in released and locked positions, and as seen from below in its locked position, FIGS. 2a-2c show in respective views one embodiment optional with respect to the one presented in FIGS. 1a-1c, in perspective views as seen obliquely from the front and above with its locking arrangement in a locked position, and as seen obliquely from the front and rearward in its released position, and FIGS. 3a-3c show likewise in respective views one embodiment optional with respect to the preceding ones, as seen obliquely from the front and above with its locking arrangement in a released position and in the process of becoming locked.

The invention relates to a locking arrangement for a means of transport to be towed such as a trailer, a tow-behind cart or the like. The purpose of a locking arrangement x is to prevent a ball clamp 1, included in a device to be towed, such as in its drawbar, from being coupled to a hitch ball included in a towing vehicle. The locking arrangement includes at least mechanical locking elements x1 for preventing the ball clamp 1 from being coupled to the hitch ball. The locking arrangement x includes electrical locking elements x2 for preventing/enabling the coupling of the ball clamp 1 to the hitch ball electrically on a remote operation principle.

In reference to the embodiments depicted in FIGS. 1a-1c, 2a-2c and 3a-3c, the electrical locking elements x2 comprise a user interface-equipped central processing unit x3 fixedly mounted on a means of transport to be towed, such as on its drawbar V, and having associated therewith the mechanical locking elements x1.

In a preferred embodiment for a locking arrangement of the invention, it has been adapted to prevent the hitch ball from being coupled to the ball clamp 1 by means of the mechanical locking elements x1 by restricting the movement of its operating handle 1a, by closing its coupling socket 1b, and/or in the like manner.

In this respect, in a further preferred embodiment, the central processing unit x3 comprises, in view of operating the mechanical locking elements x1, a user interface-equipped data processing unit, such as one or more microprocessors, a programmable logic, and/or the like.

Still, in a further preferred embodiment for a locking arrangement of the invention, its user interface comprises a keypad N for locking/releasing the mechanical locking elements x1 in a code-operated or the like manner by using the electrical locking elements x2. In yet another preferred embodiment of the invention, the central processing unit x3 includes one or more electrical connections S, such as an electrical socket, an electrical connector, and/or the like, for connecting thereto an external power supply, a data transfer cable, and/or the like.

In a still further preferred embodiment for a locking arrangement of the invention, referring specifically to FIG. 1a, it has been adapted to be electrically self-sufficient with an electrical energy storage assembly A included therein, such as with one or more batteries, supercapacitors, and/or the like. In this respect, in yet another preferred embodiment, it includes an arrangement generating electrical energy, such as one or more solar cells or the like (not shown in the drawings), for the electrical energy storage arrangement A.

In still another preferred embodiment of the invention, in association with the locking arrangement is provided a positioning system, such as one or more GPS sensors or the like, for pinpointing the location of a means of transport to be towed.

In a still further preferred embodiment of the invention, the central processing unit x3 is equipped with communication elements, such as wireless data transfer modules, SIM cards and/or the like, for operating, controlling, and/or managing the same, referring specifically to what is depicted in FIG. 1a, by means of an external data processing device M, such as a computer, a mobile phone, and/or the like. Thereby, management of the locking arrangement has been further made possible e.g. on a cloud server principle by means of a SIM card included in the locking arrangement or in a so-called lock module and connected to the phone service.

In reference specifically to what is depicted in FIGS. 1a-1c, the mechanical locking elements x1 comprise a locking piece x1', which is functionally connected to the electrical locking elements x2 and adapted to be movable in a lengthwise direction p of the ball clamp 1, and which is further preferably provided with first elements x1'a for limiting the movement of the ball clamp's 1 operating handle 1a and with second elements x1'b for closing its coupling socket 1b.

In what is a second alternative relative to the foregoing, especially in reference to the preferred embodiments presented in FIGS. 2a-2c and 3a-3c, the mechanical locking elements x1 comprise a locking plate x1", which is functionally connected to the electrical locking elements x2 and capable of rotating around a substantially vertical rotation axis in a substantially horizontal plane, or a locking member x1''' adapted to be movable in a lengthwise direction p of the ball clamp 1 for closing/opening the coupling socket 1b. The embodiment according to FIGS. 3a-3c is further provided with an operating lever K to assist in moving the locking plate x1'''.

In the foregoing preferred embodiment of the invention, the electrical locking elements x2 are disposed in a housing structure O, which is fixedly mounted on a means of transport to be towed, such as on its drawbar V, and which, in a further preferred embodiment, is fabricated from a substantially rigid structured plastic, composite, metal, light metal material, and/or the like. The housing structure is fixed to the drawbar V with attachment arms as depicted in FIGS. 1a-1c and 3a-3c or by way of screw locking and/or by gluing as depicted in FIGS. 2a-2c. When using a metal housing structure and drawbar, it is naturally also possible to fasten the housing structure fixedly by welding.

The locking arrangement of the invention is particularly suitable e.g. for commercial rental of trailers, which, by virtue of the invention, is easily possible to automate. Next follows a brief clarification of the aforesaid service when using a locking arrangement of the invention.

Use of a Locking Arrangement of the Invention from the Renter's Point of View

In connection with an online purchase, the customer takes care of identity verification, a rental agreement and payment. The customer buys a rental product of his/her desire, such as e.g. a trailer, from an online shop and receives, by way of text message and email, a code to release its lock. The code is at the customer's disposal over the entire rental period, i.e. he/she is able to lock and unlock the trailer several times during the rental period. By the time the rental period expires, he/she returns the trailer to the point of departure and secures it with the code that he/she has received.

Use of the Locking Arrangement from the Owner's Point of View

To the renter is sold a number code, by which he/she receives a trailer at his/her disposal and by which the trailer's ball socket is secured after use. The code is always different at each rental deal. The online shop creates a code which is transmitted to the trailer's lock module e.g. by way of a mobile phone system, such as 5G, 4G, or GSM communication, whereby a positioning device included in the lock module informs the online shop of the trailer's location. When the rental period is used up and the trailer has been returned to a correct location and secured, the customer's lease is recorded as being terminated. If the trailer is not returned at the agreed-upon time, the online shop shall charge the customer extra costs as specified in the agreement, e.g. with covering funds or in the like manner.

Being hooked up to the electrical system of a trailer makes it possible for the lock module e.g. to identify broken lights, thus enabling it to report these to the online shop administrator. Hence, all that is needed as a procedure at the rental station is for the employee to go and check the returned trailers and their tires cursorily e.g. on a daily basis.

It is by means of the positioning device that the owner knows the total distance that the trailer has been towed. This enables the need of equipment maintenance and renewal to be monitored proactively. It is also possible in certain cases to use distance-based pricing or to set an additional fee for long distances; for example, heavy-duty boat and automobile trailers are also often rented for a boat or car purchase and pick-up trip with a possibility of amassing even several hundred kilometers over a 24-hour period.

It is obvious that the invention is not limited to the embodiments explained or described above, but it can be varied even quite considerably both in terms of its appearance and its characteristics while being used in connection with most diverse pieces of transport equipment. Thus, it is first of all clear that the components included in the locking arrangement can be manufactured from most diverse materials by making use of most diverse manufacturing techniques. As opposed to the accompanying drawings, it is e.g. possible to dispose the locking arrangement integrally in the drawbar of a means of transport to be towed e.g. in such a way that the actuators included therein are located, possibly with the exception of a keypad, inside the drawbar's body structure.

In contrast to the above-cited locking mechanisms, it is possible in mechanical locking to utilize e.g. a hole in the hitch ball and a pin to be coupled therewith. Further, in the locking arrangement's operation/management, it is possible to employ any wireless data transfer technology, such as wifi, Bluetooth, nfc technology, and the like. On the other hand, it is possible to implement the locking arrangement more simply than described above, e.g. electrically without a battery. On the other hand, in addition to electrical locking elements, it is possible to provide the locking arrangement also with manually operated clamps or to execute the movement of mechanical locking means with auxiliary power-operated, such as e.g. pressure medium-operated or electric-powered, motors, whereby said elements move automatically after the code or e.g. a separate opening/closing function has been delivered with the keypad or with an application included in mobile phone.

The invention claimed is:

1. A locking arrangement for a means of transport to be towed, said locking arrangement being intended to prevent a ball clamp, included in a device to be towed in its drawbar, from being coupled to a hitch ball included in a towing vehicle, said locking arrangement including at least mechanical locking elements for preventing the ball clamp from being coupled to the hitch ball, and the locking arrangement including electrical locking elements for preventing/enabling the coupling of the ball clamp to the hitch ball electrically on a remote operation principle, wherein the electrical locking elements comprise a user interface-equipped central processing unit for operating, controlling and/or managing the locking arrangement by means of using both the user interface of the central processing unit, further comprising a keypad for locking/releasing the mechanical locking elements by using the electrical locking elements in a code-operated manner; and an external data processing device wherein the central processing unit is fixedly mounted on a drawbar of the means of transport to be towed.

2. A locking arrangement according to claim 1, wherein its central processing unit comprises, in view of operating the mechanical locking elements, a user interface-equipped data processing unit.

3. A locking arrangement according to claim 1, wherein the central processing unit includes one or more electrical connections for connecting thereto an external power supply; and/or a data transfer cable.

4. A locking arrangement according to claim 1, wherein it has been adapted to be electrically self-sufficient with an electrical energy storage assembly included therein.

5. A locking arrangement according to claim 4, wherein it includes an arrangement for generating electrical energy for the electrical energy storage assembly.

6. A locking arrangement according to claim 1, wherein it is provided with a positioning system for pinpointing the location of a means of transport to be towed.

7. A locking arrangement according to claim 1, wherein the central processing unit is equipped with communication elements for operating, controlling, and/or managing the same by means of the external data processing device.

8. A locking arrangement according to claim 1, wherein the mechanical locking elements comprise a locking piece, which is functionally connected to the electrical locking elements and adapted to be movable in a lengthwise direction of the ball clamp.

9. A locking arrangement according to claim 8, wherein the locking piece is provided with first elements for limiting the movement of the ball clamp's operating handle and with second elements for closing its coupling socket.

10. A locking arrangement according to claim 1, wherein the mechanical locking elements comprise a locking plate, which is functionally connected to the electrical locking elements and capable of rotating around a substantially vertical rotation axis in a substantially horizontal plane, or a locking member adapted to be movable in a lengthwise direction of the ball clamp for closing/opening the coupling socket.

11. A locking arrangement according to claim 1, wherein the electrical locking elements are arranged in a housing structure, which is fixedly mounted on the drawbar of the means of transport to be towed.

12. A locking arrangement according to claim 11, wherein the housing structure is fabricated from a substantially rigid structured plastic, composite, metal, and/or a light metal material.

13. A locking arrangement according to claim 1, wherein it is arranged integrally on the drawbar of the means of transport to be towed.

14. A locking arrangement according to claim 1, wherein the external data processing device comprises a computer or a mobile phone.

15. A locking arrangement according to claim 2, wherein the data processing unit comprises one or more microprocessors and/or a programmable logic.

16. A locking arrangement according to claim 4, wherein electrical energy storage assembly included therein comprises one or more batteries and/or supercapacitors.

17. A locking arrangement according claim 5, wherein the arrangement for generating electrical energy for the electrical energy storage assembly comprises one or more solar cells.

* * * * *